Nov. 10, 1925.                                                                1,560,703
C. H. LIDDELL
MOTION AND DIRECTION INDICATOR FOR MOTOR VEHICLES
Filed March 26, 1924         2 Sheets-Sheet 1

Inventor
C. H. Liddell
By Gross & Collings
Attorneys

Nov. 10, 1925. 1,560,703
C. H. LIDDELL
MOTION AND DIRECTION INDICATOR FOR MOTOR VEHICLES
Filed March 26, 1924    2 Sheets-Sheet 2
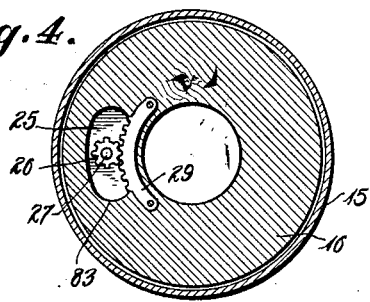
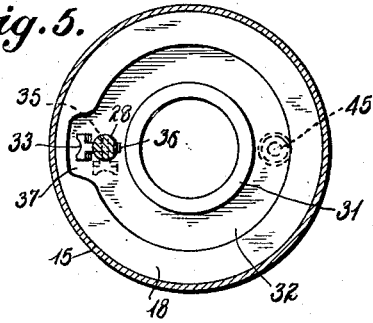
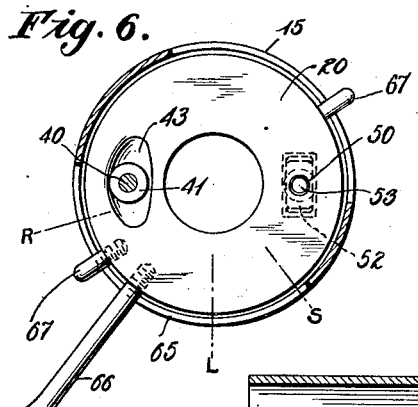
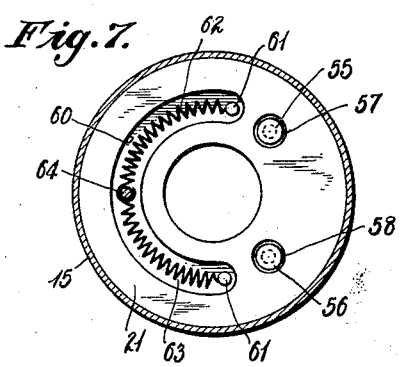
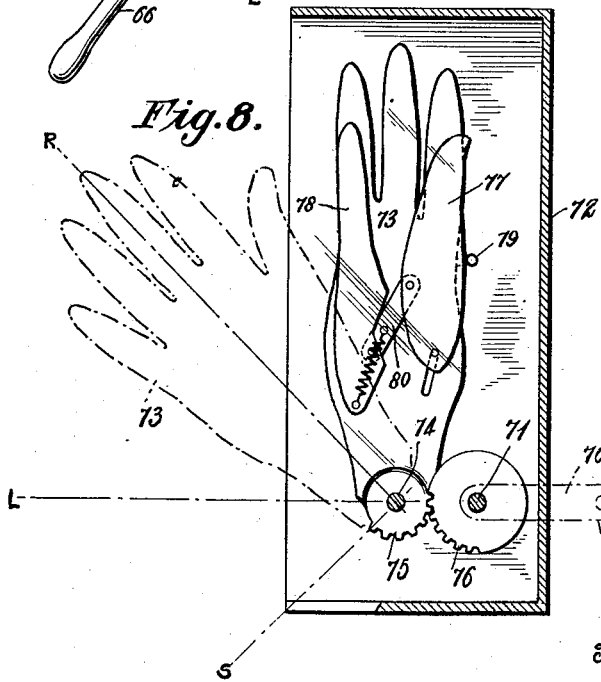
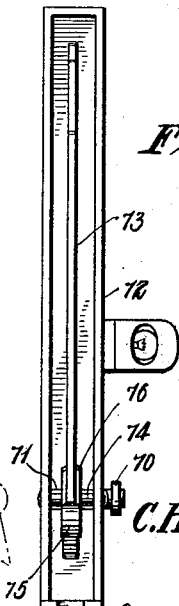
Inventor
C.H. Liddell
By Gross & Collings
Attorneys Patented Nov. 10, 1925.

1,560,703

UNITED STATES PATENT OFFICE.

CHARLES H. LIDDELL, OF RAYMOND, WASHINGTON.

MOTION AND DIRECTION INDICATOR FOR MOTOR VEHICLES.

Application filed March 26, 1924. Serial No. 702,042.

*To all whom it may concern:*

Be it known that I, CHARLES H. LIDDELL, a citizen of the United States, residing at Raymond, in the county of Pacific and State of Washington, have invented certain new and useful Improvements in Motion and Direction Indicators for Motor Vehicles, of which the following is a specification.

This invention relates to motion and direction indicators for vehicles, and has for one of its objects to provide a device of this character which may be efficiently employed to indicate to the operators of approaching and following vehicles, as well as to pedestrians and others, the intended movements of the operator of the vehicle carrying the apparatus.

A further object of the invention is to provide a device of the class described in which the indicator or indicators may be conveniently located at some point on the vehicle where they will be readily visible from both the front and rear, while the control mechanism for actuating the indicators is conveniently located, for example, on the steering column.

A still further object of the invention is to provide a motion and direction indicator in which the indicating mechanism may be manually set and will be automatically reset by the movements of a portion of the steering mechanism.

With the above and other objects in view which will appear as the description proceeds, the invention consists in the novel details of construction and combinations and arrangements of parts, more fully hereinafter described and particularly pointed out in the appended claims.

Referring to the accompanying drawings forming a part of this specification in which like numerals designate like parts in all the views.

Figure 2:
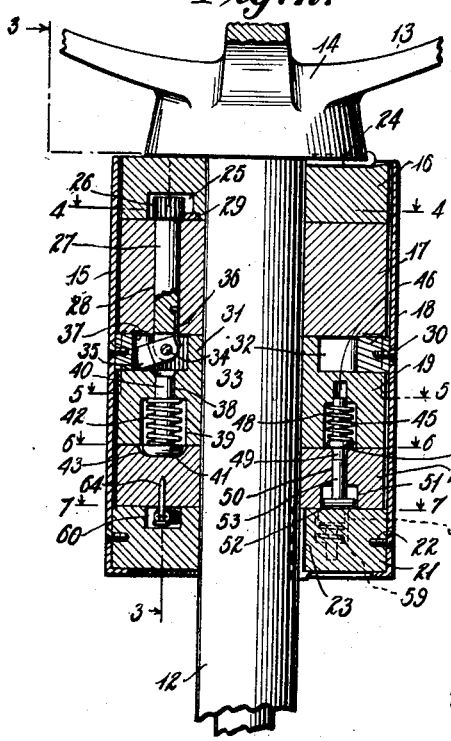
Fig. 2 is an enlarged vertical sectional view through the control mechanism. the steering mechanism of the automobile being shown in elevation.
Figure 3:
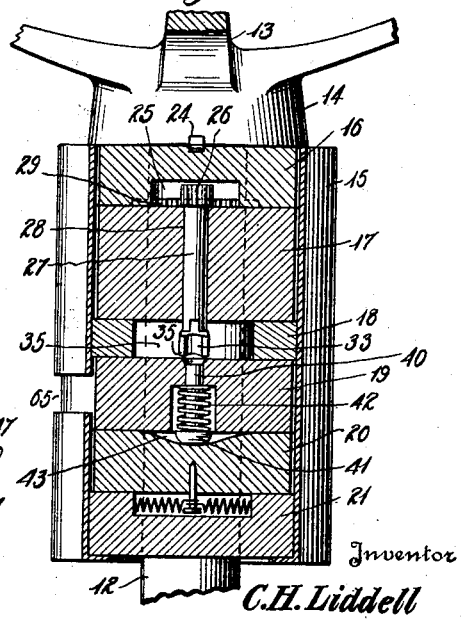
Fig. 3 is a vertical sectional view of the parts shown in Fig. 2, taken approximately on the plane indicated by the line 3—3 of the said figure, looking in the direction of the arrows.

Figs. 4, 5, 6 and 7 are horizontal cross sectional elevational views of the parts shown in Figs. 2 and 3, taken respectively upon the planes indicated by the lines 4—4, 5—5, 6—6, and 7—7 of Fig. 2, looking down;

Fig. 8 is a vertical sectional elevational view of the indicating mechanism and housing therefor; and, Fig. 9 is an edge elevational view of the parts shown in Fig. 8, as seen from the left of the said vehicle.

Referring more particularly to the said drawings, the numeral 10 indicates generally the body of an automobile of any type, here shown as a car of the pleasure type, which is provided with a windshield frame 11 and a steering column 12, surmounted by the usual steering wheel 13. The control mechanism for actuating the indicating portion of the present invention is preferably encased in a suitable housing 15, here shown as comprising the thin hollow metal cylinder mounted adjacent the upper end of the steering column 12 immediately below the hub 14 of the steering wheel 13.

The said control mechanism comprises a plurality of superposed discs 16, 17, 18, 19, 20 and 21, mounted within the said housing 15 and provided with central axial apertures whereby they may be slipped upon the steering column 12, as will be readily understood. The lower disc 21 is secured in any suitable manner as by the screws 22 to the housing 15 and the said disc is likewise rigidly secured in any suitable manner, for example, by the key 23, to the steering column 12. The uppermost disc 16 is freely rotatable within the casing or housing 15 and is rigidly connected to the hub 14 of the steering wheel 13, so as to rotate therewith, in any suitable manner, as for example by means of the key 24.

As is best shown in Figs. 2, 3 and 4, the disc 16 is provided on its under surface with a recess 25, which is adapted to accommodate a pinion 26, rigidly carried by the upper end of a shaft 27, journalled in a suitable bore 28, with which the disc 17 is provided. The said disc 16 rigidly carries a segmental gear or rack 29, the teeth of which mesh with the teeth of the pinion 26, so that when there is relative movement between the discs 16 and 17, as will presently appear, the said pinion 26 and shaft 27 will be oscillated through a predetermined arc of a circle.

The parts are so designed and constructed that the recess 25, while somewhat elongated, as shown in Fig. 4, is relatively short, and when a predetermined amount of angular movement of the disc 16, relative to the disc 17, has occurred, one end of the wall or the other of the said recess will be brought into contact with the outer circumference of the said pinion and any further movement of the disc 16 will be transmitted directly to the disc 17, so that the two will move in unison.

The third disc 18 is rigidly secured to the outer housing 15, as by the screw 30, and its central aperture is of somewhat greater diameter than that of the steering column 12. The fourth disc 19 is provided with an annular flange 31, surrounding its central aperture on its surface, which projects upwardly to engage the lower surface of the disc 17, as will be clear from Fig. 2, the outside diameter of the said flange being somewhat less than the diameter of the aperture in the disc 18, thereby providing an annular groove 32 between the discs 17 and 19, into which groove projects the lower end of the shaft 27, see Figs. 2 and 3. This said lower end is preferably bifurcated to receive one end of a dog 33, which is pivotally secured thereto by a pin 34, see Figs. 2, 3 and 5, and the toe 35 of the said dog is normally urged downwardly into engagement with the upper surface of the disc 19 by means of a suitable spring 36 carried by the shaft 28, as will be readily apparent.

As is best shown in Fig. 5, the inner circumference of the disc 18 is cut away, as indicated at 37 to provide a recess adapted to permit of the oscillation of the dog 33 through an arc of approximately 180 degrees, for a purpose which will appear more fully below.

The fourth disc 19 is provided with an eccentrically located bore 38 and a counter-bore 39, which are so positioned as to be normally in axial alignment with the shaft 27. A plunger or pin 40 is slidably mounted in the bore 38 and is provided with an enlarged head 41, which may enter the counter-bore 39, which counter-bore also receives a suitable spring 42 surrounding the said pin 40 and engaging its head to normally urge the pin downwardly, as will be readily understood. The upper surface of the fifth disc 20 is provided with a recess 43 into which the said head 41 may be received when the parts are in their normal or inoperative positions.

The fourth disc 19 and the fifth disc 20 are initially locked together, so as to move in unison, by a locking means which will now be described, the said locking means being automatically operated to unlock the said discs at a predetermined point during their movement, whereby the disc 20 may be returned to its initial position in advance of the disc 19. The said locking means is here illustrated as comprising a locking pin 45, see Figs. 2, and 5, slidably mounted in a bore 46 with which the disc 19 is provided, the said disc being counter-bored to accommodate the enlarged head 47 of the said locking pin 45, as well as the coiled spring 48 which normally urges the pin downwardly, as viewed in Fig. 2.

The said pin 45 is further provided with a reduced extension or projection 49 below the head 47, which may enter the upper portion of a bore 50 with which the disc 20 is provided, the said bore being normally in axial alignment with the bore 46 of the disc 19. The said disc 20 is also provided with an enlarged recess 51 to receive the enlarged head or shoe 52 of a pin or plunger 53, which is slidably mounted within the bore 50, the said head, when in its lowermost position, engaging the upper surface of the sixth disc 21.

The lowermost disc 21 which is rigidly secured to the steering column 12 against both axial and circumferential movement, is provided with a pair of spaced plunger members 55 and 56, see Figs. 2 and 7, which are received in suitable recesses 57 and 58 respectively, provided in the upper surface of the said disc 21. These said plunger members are normally urged upwardly by means of suitable springs, such as 59, see Fig. 2, into engagement with the lower surface of the disc 20, and they are so positioned radially from the axis of the discs as to lie in the path of travel of the shoe 52, so that they may contact therewith at predetermined times, to urge the said shoe and plunger 53 upwardly to unlock the discs 19 and 20.

It will, of course, be understood that the springs such as 59 must be heavy enough to exert a force greater than that exerted by the spring 48, so that when they apply upward pressure to the plunger 53, the latter will, through its contact with the projection 49, raise the locking pin 45 until the said projection 49 clears the disc 20, whereupon movement of the disc 20 relative to the disc 19 in a circumferential direction, will be possible.

The disc 21 is further provided on its upper surface with an arcuate groove or recess 60, see Figs. 2 and 7, extending through an arc of approximately 180 degrees, and the said groove is provided at or adjacent its ends with pins or projections 61, to which are secured the ends of the coiled springs 62 and 63, as will be clear from the said Fig. 7. The other ends of the said springs 62 and 63, are secured to a pin 64, carried by the disc 20, as will be clear from the drawings.

The casing or housing 15 of the control mechanism is provided with the arcuate slots 65, adjacent the disc 19, through which project an operating handle or lever 66, which is rigidly secured to the said disc 19, and the downwardly extending rods 67, to the lower ends of which is secured the ring member 67', rotatably mounted on the steering column 12, which is provided with a suitable ball or other universal joint 68, which is connected through the medium of a connecting rod or link 69 to a crank arm 70, carried by a shaft 71, suitably mounted for rotation in the casing or housing 72 of the indicator. The said indicator may be of any desired form, but is here shown as comprising an indicating member 73 of sheet metal or other material, cut to simulate a human hand, which member is pivotally mounted within the casing 72 upon a shaft 74. The said indicator member 73 has integrally formed therewith, or rigidly connected thereto, a segmental gear 75, the teeth of which mesh with a companion gear 76, rigidly mounted upon the shaft 71.

Figure 1:
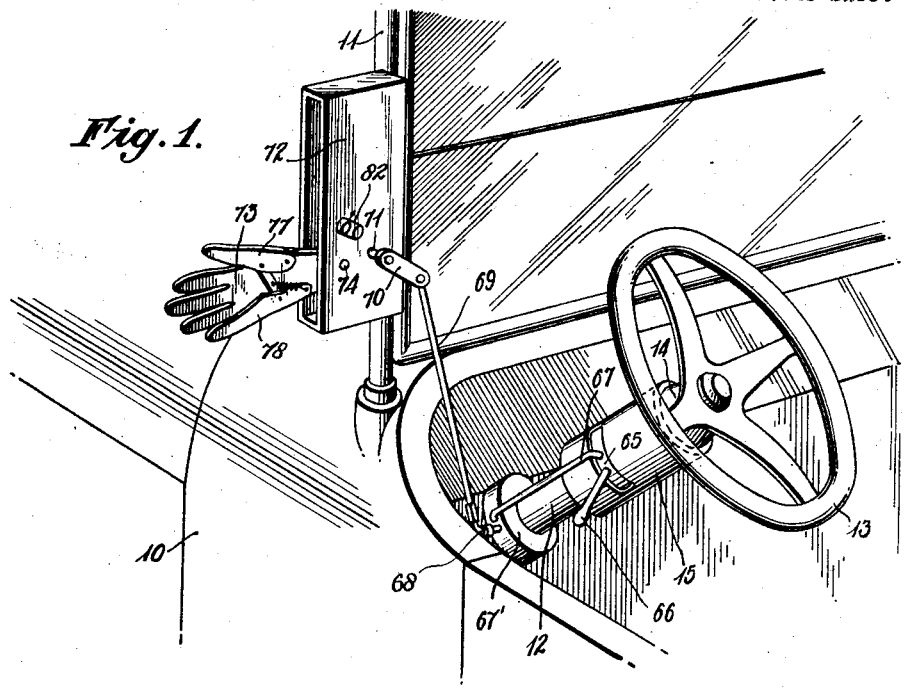
Figure 1 is a perspective view of a portion of a motor vehicle showing a single indicator attached to the windshield frame thereof and the control mechanism therefor positioned upon the steering column.

The indicator member 73 carries a pair of pivotally mounted digits 77 and 78 which are interconnected by a link 80, and which, under the influence of a spring 81, are moved to a spread position, as shown in Fig. 1, whenever the indicator occupies any but the neutral position. The digit 77 may engage a suitable stop 79 or the back wall of the casing 72 when in the neutral position to cause the digits to assume the positions shown in full lines in Fig. 8. A lamp 82 may be mounted on the casing 72 to illuminate the indicator at night.

The operation is as follows. Supposing, for example, it be desired to make a right hand turn and to indicate the same to approaching or following drivers, pedestrians, or others. The operator of the machine equipped with the present invention will grasp the operating handle 66 and will move the same in a counter-clockwise direction, as viewed in Figs. 1 and 6, to the limit of its movement. This motion will, of course, be transmitted to the disc 19, which carries the handle 66, and since this disc 19 is at this time interlocked with the disc 20 by reason of the projection 49 of the locking pin 45 engaging the upper portion of the bore 50 of the disc 20, this latter disc will likewise be moved.

The movement of the disc 20 will be against the tension of the spring 63, by reason of the connection of the said disc with the said spring by means of the pin 64. Such movement of the two discs in the same direction will continue until the limit of movement of the disc 19 has been reached, at which point the shoe 52 of the plunger 53 will engage the upwardly acting plunger member 56. As above explained, the spring 59 associated with this plunger member 56, is stronger than the spring 48, associated with the locking pin 45, and it will therefore cause an upward motion of the plunger 53 until its head or shoe 52 engages the upper surface of the enlarged recess 51, at which time the projection 49 of the locking pin 45 will have been moved out of the upper portion of the bore 50, thereby unlocking the disc 20 from the disc 19, whereupon the spring 63 will act to restore the disc 20 to its original position.

This movement in a circumferential direction of the disc 20, relative to the disc 19, will move the recess 43 in the upper surface of the said disc 20, out of alignment with the head 41 of the pin or plunger 40, causing the said head to ride up on the upper surface of the disc 20, against the pressure of the spring 42. This upward movement of the plunger 40 will cause its upper end to project beyond the upper surface of the disc 19 and into the annular groove 32.

The indicator in the meantime, will have been moved from its full line position indicated in Fig. 8, to its dotted line position, shown therein, by reason of the movement of the ring 67', connecting rod 69, crank arm 70, shaft 71, gear 76 and gear 75, and the parts will remain in this position until the right hand turn has been made and the car again straightened out, when the parts will be automatically restored to their initial or inoperative positions in the following manner.

When the steering wheel 13 is moved in a clockwise direction, as viewed in Fig. 1, to accomplish the right hand turn, it will carry with it the first disc 16, by reason of the rigid connection 24 between the said wheel and disc. This motion of the disc 16 will initially cause the rack or segmental gear 29 to produce a movement of the pinion 26, through an arc of substantially 90 degrees in a counter-clockwise direction, as viewed in Fig. 4. This movement of the pinion 26 and its shaft 27 will cause the dog 33 to be moved from its full line position shown in Fig. 5, to its dotted line position shown therein. This motion of the pinion shaft and dog will be accomplished with very little motion of the steering wheel 13, and continued motion of the latter will bring the lower end wall 83 of the recess 25 into engagement with the outer circumference of the pinion 26, whereupon further motion of the wheel 13 and disc 16 will be transmitted directly to the disc 17, thereby carrying the dog into the annular groove 32.

As the said dog travels through the said groove, its toe 35 will strike the upper projecting end of the plunger 40, which as was above disclosed, has been elevated into the said groove, but by reason of the said dog being yieldingly pressed by the spring 36, it will rise and ride over the said pin, to assume a position beyond the same.

When the right hand turn has been completed and the steering wheel is moved in a counter-clockwise direction to again straighten out the car, its motion will be transmitted through the disc 16 to the pinion 26 and disc 17 to move the latter disc in a counter-clockwise direction also. During such reverse movement, relative movement between the disc 16 and its meshing rack or gear 29 will be prevented, due to the fact that the dog 33 is in the narrow portion of the groove 32, which portion is of such width as to prevent rotation of the dog therein.

It therefore follows that as the circumferential movement of the dog about the axis of the steering column in a reverse direction is accomplished, its toe 35 will again engage the upper projecting end of the pin 40, this time in such a manner that it will not ride over the same, but will transmit its motion to the said pin and through it to the disc 19, until the latter is restored to such a position that the head 41 of the pin 40 will again enter the recess 43 of the disc 20, at which time the parts are in their normal or inoperative positions. This reverse movement of the disc 19 will, of course, be transmitted through the various connections 67, 68, 69, 70, 71, 76 and 75 to the indicator member 73 to restore it to its initial position within the housing 72.

The operations for a left hand turn are similar except that the movements will be in the opposite directions to those above disclosed, and the operations necessary to cause the indicator to indicate that the car is about to stop are similar to those necessary for a left hand turn, except that the operating lever 66 is moved further than for a left hand turn, thereby causing the indicator hand 73 to move through an arc of approximately 135 degrees from its initial position. In the case of the stop indication it will, of course, be necessary to reset the indicator manually through the medium of the operating handle 66, since there being no motion of the steering mechanism in stopping and starting the car, it would be obviously impossible to reset the indicator automatically in the manner above disclosed in connection with the right hand turn.

While one form of the invention is illustrated and described, it is obvious that those skilled in the art may vary the details of construction as well as the arrangements of parts without departing from the spirit of the invention, and therefore it is not wished to be limited to the above disclosure except as may be required by the accompanying claims.

What is claimed is:

1. An operating mechanism for vehicle motion and direction indicators comprising an oscillatory disc, connected to said indicator; means whereby said disc may be moved to set said indicator; a second disc connected to the steering mechanism of the vehicle; and means for connecting said discs, whereby said second disc may move said first disc, and return said indicator to non-indicating position.

2. In an operating mechanism for vehicle indicators, a disc mounted for oscillation and adapted to be connected to an indicator; a second disc connected to the steering mechanism of the vehicle; a pin carried by said first disc; means for projecting a portion of said pin above the surface of said disc; and means operable by said second disc to engage said projecting portion and to move said pin and first disc.

3. In an operating mechanism for vehicle indicators, a disc mounted for oscillation and adapted to be connected to an indicator; a second disc connected to the steering mechanism of the vehicle; a third disc interposed between said first and second discs; a pin carried by said first disc; means for projecting a portion of said pin beyond the surface of said disc; and a dog carried by said third disc, adapted to engage said pin, said dog and third disc being oscillatable by said second disc to move said first disc.

4. In an operating mechanism for vehicle indicators; a disc mounted for oscillation and adapted to be connected to an indicator; a second disc connected to the steering mechanism of the vehicle; a third disc interposed between said first and second discs; a pin carried by said first disc; means for projecting a portion of said pin beyond the surface of said disc comprising a fourth disc having a recess for normally receiving the head of said pin; and a dog carried by said third disc, adapted to engage said pin, said dog and third disc being oscillatable by said second disc to move said first disc.

5. In an operating mechanism for vehicle indicators, a disc mounted for oscillation and adapted to be connected to an indicator; a second disc connected to the steering mechanism of the vehicle; a third disc interposed between said first and second discs; a pin carried by said first disc; means for projecting a portion of said pin beyond the surface of said disc comprising a fourth disc having a recess for normally receiving the head of said pin; means for interlocking said first and fourth discs, whereby they will move together through a predetermined arc; means for automatically unlocking said discs; and a dog carried by said third disc, adapted to engage said pin, said dog and third disc being oscillatable by said second disc to move said first disc.

6. In an operating mechanism for vehicle indicators; a disc mounted for oscillation and adapted to be connected to an indicator; a second disc connected to the steering mechanism of the vehicle; a third disc interposed between said first and second discs; a pin carried by said first disc; means for projecting a portion of said pin beyond the surface of said disc comprising a fourth disc having a recess for normally receiving the head of said pin; means for interlocking said first and fourth discs, whereby they will move together through a predetermined arc; means for automatically unlocking said discs; means for automatically returning said fourth disc to its initial position independently of said first disc; and a dog carried by said third disc, adapted to engage said pin, said dog and third disc being oscillatable by said second disc to move said first disc.

In testimony whereof I affix my signature.

CHARLES H. LIDDELL.